US011305894B2

(12) United States Patent
DeChellis et al.

(10) Patent No.: US 11,305,894 B2
(45) Date of Patent: Apr. 19, 2022

(54) DETECTION OF FAN CASE LINER DAMAGE DURING TURBINE ENGINE OPERATION

(71) Applicant: Gulfstream Aerospace Corporation, Savannah, GA (US)

(72) Inventors: Vincent DeChellis, Savannah, GA (US); Mike Lucas, Savannah, GA (US); Tongan Wang, Savannah, GA (US); Nicholas Ward, Savannah, GA (US); Paul Conti, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 243 days.

(21) Appl. No.: 16/697,929

(22) Filed: Nov. 27, 2019

(65) Prior Publication Data

US 2020/0172269 A1     Jun. 4, 2020

Related U.S. Application Data

(60) Provisional application No. 62/773,943, filed on Nov. 30, 2018.

(51) Int. Cl.
*B64F 5/60* (2017.01)
*B64D 45/00* (2006.01)
*G01M 15/14* (2006.01)

(52) U.S. Cl.
CPC ............... *B64F 5/60* (2017.01); *B64D 45/00* (2013.01); *G01M 15/14* (2013.01); *B64D 2045/0085* (2013.01)

(58) Field of Classification Search
CPC ... B64F 5/60; B64D 45/00; B64D 2045/0085; G01M 15/14; F05D 2260/96; F05D 2260/80; F01D 21/003; F01D 17/02
See application file for complete search history.

(56) References Cited

U.S. PATENT DOCUMENTS

| | | | |
|---|---|---|---|
| 2004/0020994 A1* | 2/2004 | Muehl | G06Q 10/06 235/492 |
| 2006/0260323 A1* | 11/2006 | Moulebhar | F02C 7/268 60/793 |
| 2012/0152007 A1* | 6/2012 | Holmes | G06F 30/15 73/112.01 |
| 2013/0160291 A1* | 6/2013 | Broughton | B23P 6/005 29/888.021 |

(Continued)

FOREIGN PATENT DOCUMENTS

| | | |
|---|---|---|
| EP | 2461010 A1 | 6/2012 |
| EP | 3093440 A1 | 11/2016 |
| EP | 3351749 A2 | 7/2018 |

*Primary Examiner* — Mussa A Shaawat
(74) *Attorney, Agent, or Firm* — LKGlobal | Lorenz & Kopf, LLP (57) ABSTRACT

An aircraft includes a turbine engine, a vibration sensor, and a processor. The vibration sensor is attached to the turbine engine and is configured to output a vibration sensor signal. The processor is programmed to determine whether the vibration sensor signal indicates that fan case liner damage has occurred due to icing conditions. The processor is further programmed to indicate that a fan case inspection should be conducted in response to the vibration sensor signal indicating that fan case liner damage has occurred.

18 Claims, 4 Drawing Sheets

(56) References Cited

U.S. PATENT DOCUMENTS

| | | | |
|---|---|---|---|
| 2014/0007591 A1* | 1/2014 | Khibnik | F01D 21/003 |
| | | | 60/805 |
| 2015/0233789 A1* | 8/2015 | Balandier | G01M 5/0016 |
| | | | 73/112.01 |
| 2017/0101888 A1* | 4/2017 | Bouillon | F01D 25/02 |
| 2018/0322714 A1* | 11/2018 | Gennotte | G06Q 10/08 |
| 2020/0032670 A1* | 1/2020 | Morris | F02C 7/047 |
| 2020/0131928 A1* | 4/2020 | Saenz | B08B 3/10 |
| 2020/0207488 A1* | 7/2020 | Troy | B64F 5/60 |

* cited by examiner

DETECTION OF FAN CASE LINER DAMAGE DURING TURBINE ENGINE OPERATION

CROSS-REFERENCE TO RELATED APPLICATION

This application claims the benefit of U.S. Provisional Application No. 62/773,943, filed Nov. 30, 2018, which is incorporated herein by reference in its entirety.

TECHNICAL FIELD

The present disclosure generally relates to systems and methods for detecting damage to turbine engines, and more particularly relates to detection of fan case liner damage by evaluating higher order harmonics of the fan rotor rotation frequency.

BACKGROUND

When ice forms on the fan blades of turbine engines, damage to the turbine engine may occur. For example, the ice releasing from individual fan blades may cause the fan to become unbalanced. The unbalanced rotation of the fan causes the fan to become uncentered within a fan casing. When the fan becomes uncentered, the fan blades may contact the inside of the fan casing and wear away liner material from the interior of the fan casing. The worn away material increases a gap between the tip of the fan blade and the interior surface of the fan casing. The increase in the gap may reduce engine performance and/or cause other difficulties with flight of an aircraft powered by the turbine engine.

Conventional systems for detecting these "rubout" events rely on monitoring a magnitude of vibration of the turbine engine at the rotational frequency of the rotor in the turbine engine. These conventional systems may not detect all rubout events and may falsely indicate a rubout event has occurred. Accordingly, some conventional systems indicate that the turbine engine should be inspected after every flight through known icing conditions. Such inspection requires manual measurement of the gaps between the fan blades and fan casing. The time and manpower requirement for such manual inspections may cause delays and additional costs to the operators of an aircraft that includes the turbine engine.

SUMMARY

In a first example, an aircraft includes a turbine engine, a vibration sensor, and a processor. The vibration sensor is attached to the turbine engine and is configured to output a vibration sensor signal. The processor is programmed to determine whether the vibration sensor signal indicates that fan case liner damage has occurred due to icing conditions. The processor is further programmed to indicate that a fan case inspection should be conducted in response to the vibration sensor signal indicating that fan case liner damage has occurred.

In a second example, a device for damage monitoring of a turbine engine includes an input port and a processor. The input port is configured to receive a vibration sensor signal from a vibration sensor attached to the turbine engine. The processor is programmed to determine whether the vibration sensor signal indicates that fan case liner damage has occurred in the turbine engine due to icing conditions. The processor is further programmed to indicate that a fan case inspection should be conducted in response to the vibration sensor signal indicating that fan case liner damage has occurred.

In a third example, a method includes: retrieving a rotor rotation frequency of a turbine engine; forming a harmonic indicator based on at least one harmonic frequency of the rotor rotation frequency; measuring a vibration of the turbine engine at the at least one harmonic frequency; and generating a potential engine damage alert in response to the harmonic indicator reaching a predetermined threshold.

BRIEF DESCRIPTION OF THE DRAWINGS

Advantages of the systems and methods described herein will be readily appreciated, as the same becomes better understood by reference to the following detailed description when considered in connection with the accompanying drawings wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

It is further noted that the systems and methods may be implemented on various types of data processor environments (e.g., on one or more data processors) which execute instructions (e.g., software instructions) to perform operations disclosed herein. Non-limiting examples include implementation on a single general purpose computer or workstation, or on a networked system, or in a client-server configuration, or in an application service provider configuration. For example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein. For example, a computer can be programmed with instructions to perform the various steps of the flowcharts described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., memory, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable storage media including computer storage mechanisms (e.g., non-transitory media, such as CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Various embodiments disclosed herein describe methods and systems for detecting damage to housings of rotating components. Specifically, the methods and systems may be used for near real time identification of damage done to a turbine engine fan case liner resulting in increased fan tip clearances and loss of thrust. The methodology uses a tracked vibration filter that has been shown to correlate the presence of engine fan case liner rub out damage to the presence of vibration from the engine's higher orders/harmonics.

Figure 1:
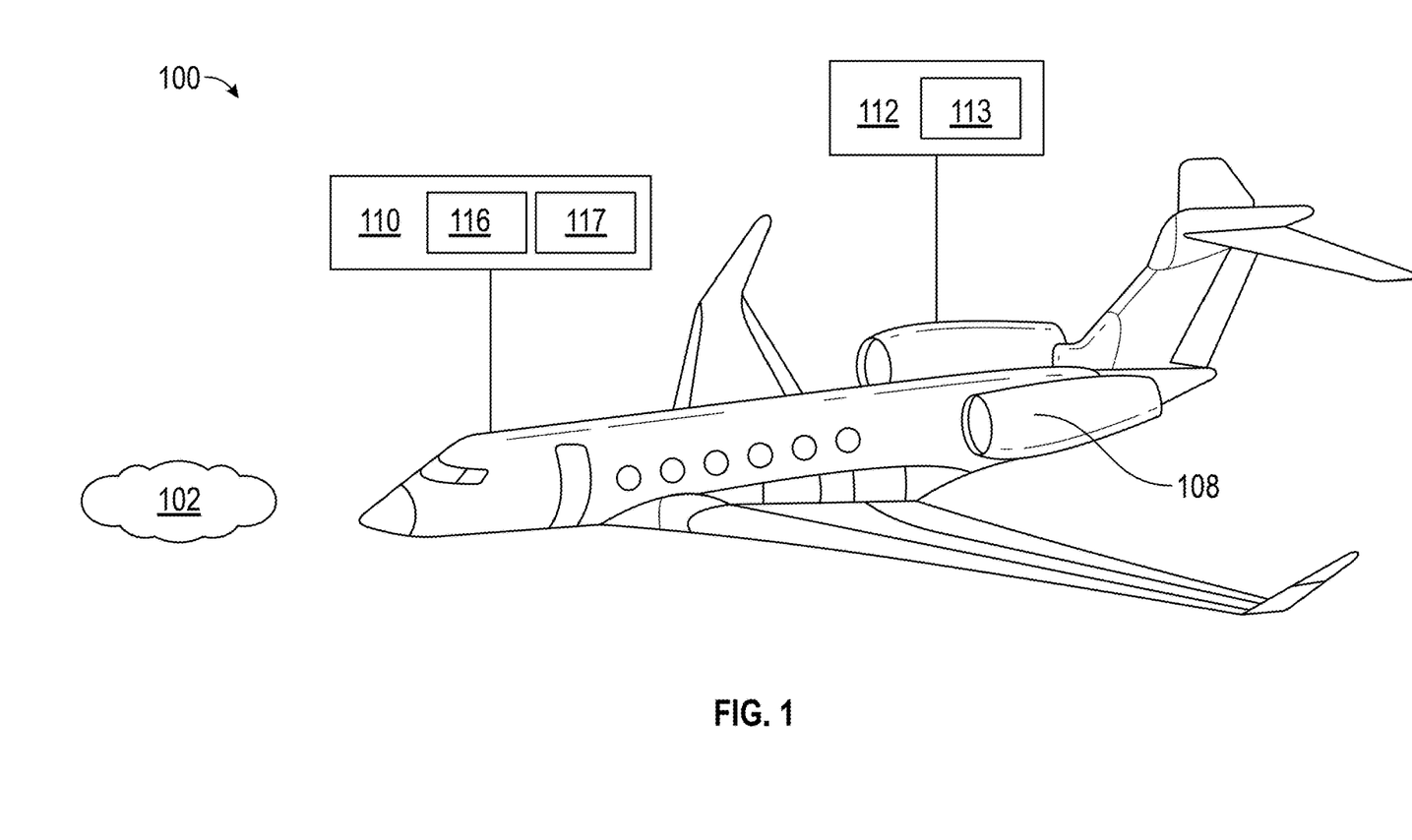
FIG. 1 is a schematic diagram illustrating an aircraft having a control system, in accordance with the teachings of the present disclosure.

Referring now to FIG. 1, an example of an aircraft 100 flying into icy conditions 102 is illustrated in accordance with some embodiments. Aircraft 100 includes a turbine engine 108, monitor system 110, and a sensor system 112, among other systems. Although aircraft 100 is described in this description as an airplane, it should be appreciated that monitor system 110 may be utilized in other aircraft, land vehicles, water vehicles, space vehicles, or other machinery that utilizes rotating components contained within a case or housing without departing from the scope of the present disclosure. For example, monitor system 110 may be utilized in submarines, helicopters, airships, spacecraft, or automobiles.

Monitor system 110 is configured to monitor systems on aircraft 100 and to perform the methods described below. In the example provided, monitor system 110 is an external device coupled for electronic communication with a vibration sensor or engine controller of aircraft 100. For example, monitor system 110 may have its own housing and input port to communicate with the sensor or engine controller and has built-in capability to process the engine vibration transducer signal(s) and decode engine tachometer signal(s) in near real time. Furthermore, monitor system 110 is configured to conduct spectral analysis to extract the spectral content from the vibration sensor signal and to calculate the inspection metrics. Accordingly, monitor system 110 may be used/plugged in only when aircraft 100 is expected to fly through icing conditions, or may be plugged in seasonally, all the time, or at any other time it may be desirable to monitor engine 108 for fan case liner damage. In some embodiments, monitor system 110 is integrated with an engine controller of aircraft 100. For example, the method described below may be programmed directly into the engine controller.

In some embodiments, monitor system 110 is configured to vary a voltage input to interface with different engines or engine controllers according to the engine and/or aircraft make and model. In some embodiments, monitor system 110 is configured to provide power to vibration sensor 113 if needed. Monitor system 110 may be powered through the connection with aircraft 100 or externally without departing from the scope of the present disclosure.

Monitor system 110 includes at least one processor 116 and a non-transitory computer readable storage device or medium 117. Non-transitory computer readable storage device or medium 117 is storage device for storing instructions for performing the method described below. At least one processor 116 is one or more data processors configured to execute the instructions to perform the method described below. The processor may be any custom made or commercially available processor, a central processing unit (CPU), a graphics processing unit (GPU), an auxiliary processor among several processors associated with monitor system 110, a semiconductor based microprocessor (in the form of a microchip or chip set), a macroprocessor, any combination thereof, or generally any device for executing instructions. The computer readable storage device or medium may include volatile and nonvolatile storage in read-only memory (ROM), random-access memory (RAM), and keep-alive memory (KAM), for example. The computer-readable storage device or medium may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by monitor system 110 in controlling aircraft 100.

Although only one monitor system 110 is shown in FIG. 1, embodiments of aircraft 100 may include any number of monitor systems 110 that communicate over any suitable communication medium or a combination of communication media and that cooperate to process the sensor signals, perform logic, calculations, methods, and/or algorithms. In various embodiments, one or more instructions of monitor system 110, when executed by the processor, performs the methods described below.

Sensor system 112 includes one or more sensing devices that sense observable conditions of the exterior environment, the interior environment of aircraft 100, or operational conditions and status of aircraft 100. For example, sensor system 112 may include accelerometers, gyroscopes, RADARs, LIDARs, global positioning systems, optical cameras, thermal cameras, ultrasonic sensors, and/or other sensors. In the example provided, sensor system 112 includes a vibration sensor 113 physically coupled with turbine engine 108 to measure vibration of turbine engine 108. Vibration sensor 113 may be any sensor configured to obtain vibration information for turbine engine 108, such as an accelerometer or a velocimeter. Vibration sensor 113 outputs vibration sensor data that may be used to extract acceleration, velocity, and displacement data describing turbine engine 108.

Figure 2:
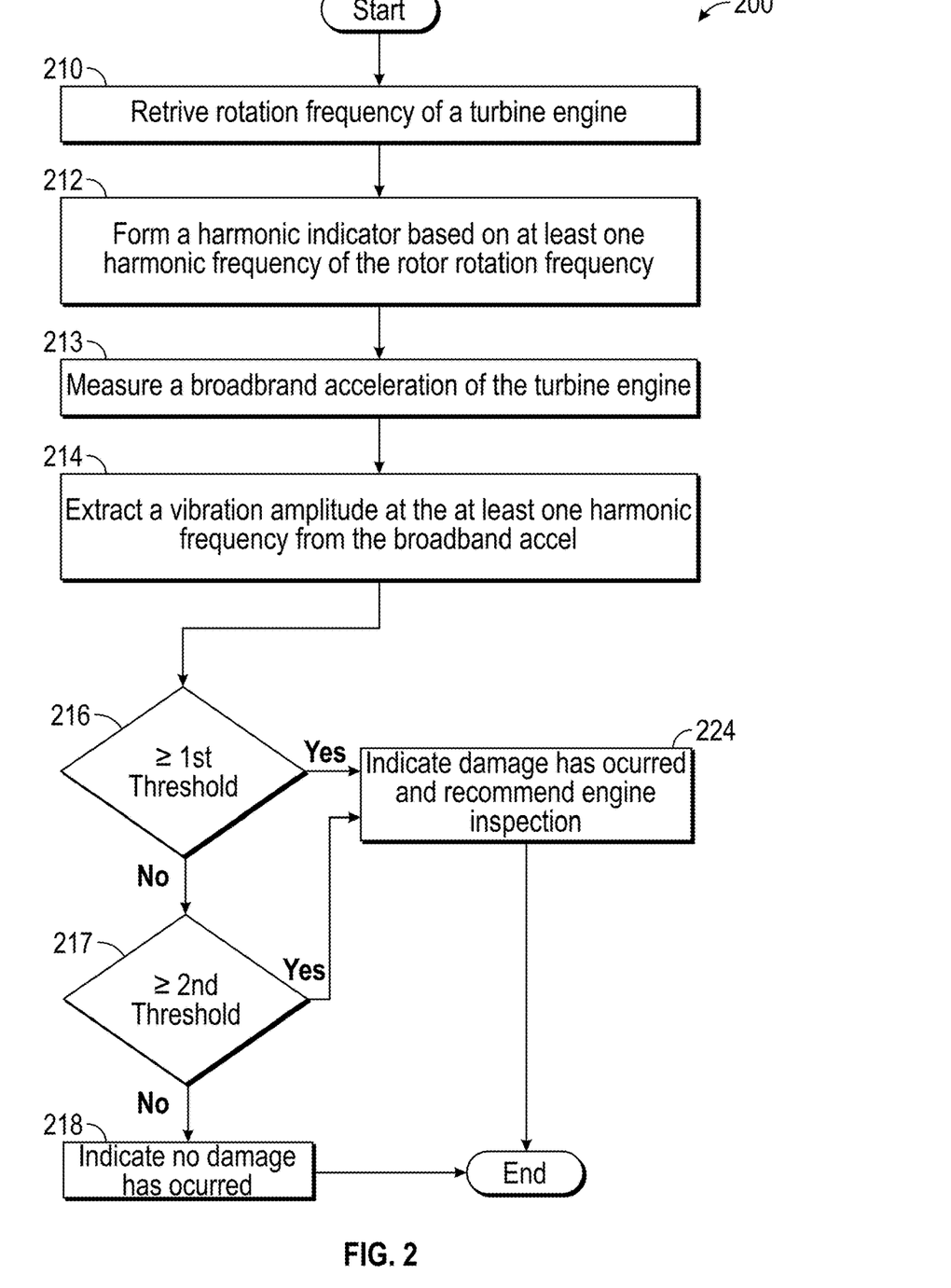
FIG. 2 is a flow diagram illustrating a method of detecting damage to a turbine engine of the aircraft of FIG. 1 in accordance with the teachings of the present disclosure.

Referring now to FIG. 2, and with continued reference to FIG. 1, a method 200 for determining whether turbine engine damage has occurred is illustrated in accordance with some embodiments. In the example provided, monitor system 110 performs the tasks of method 200. For example, instructions may be stored on storage device 117 and one or more processors 116 may be configured to execute the instructions. Other systems may be utilized to perform method 200 without departing from the scope of the present disclosure. In the example provided, method 200 is utilized to detect fan case liner damage in turbine engine 108.

Task 210 retrieves a rotor rotation frequency of a turbine engine. For example, monitor system 110 may retrieve the rotor rotation frequency from sensor system 112.

Figure 3:
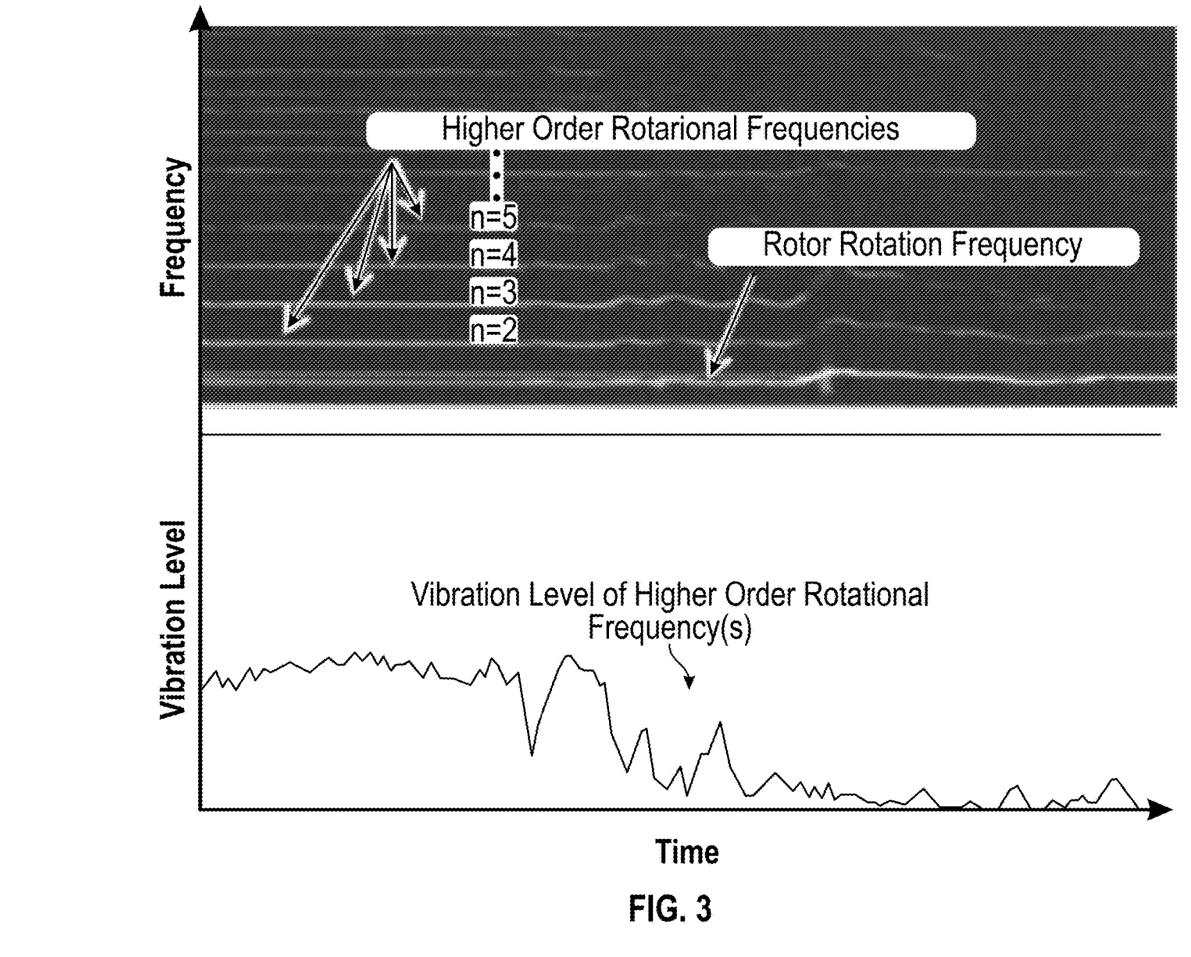
FIG. 3 is a simplified graph illustrating amplitudes of a fan rotational frequency and harmonics thereof over time for a turbine engine of the aircraft of claim 1 in accordance with the teachings of the present disclosure.

Task 212 forms a harmonic indicator based on at least one harmonic frequency of the rotor rotation frequency. As used herein, the term "harmonic frequency" includes all higher order integer and non-integer harmonic frequencies, but specifically excludes the fundamental frequency N1 that is sometimes called the first harmonic. An integer harmonic frequency is an integer multiple of the rotor rotation frequency. For example, monitor system 110 may form the harmonic indicator based on the harmonic frequencies n=2, 3, 4, 5, . . . 24, etc. as illustrated in FIG. 3. The harmonic indicator may be a single harmonic frequency, multiple harmonic frequencies individually evaluated against a threshold, or may be a mathematical combination of a plurality of harmonic frequencies of the at least one harmonic frequencies. For example, multiple harmonic frequencies may be added, subtracted, multiplied, and otherwise combined with each other using any vector magnitude or aggregate magnitude methods to form the harmonic indicator. The actual numerical values used for the harmonic frequencies used may vary from those illustrated and will vary by engine and aircraft model. In some embodiments, the harmonic frequencies used to form the harmonic indicator are non-sequential. The harmonic indicator may indicate vibration caused from individual blades contacting the casing of turbine engine 108.

Task 213 measures a broadband acceleration of the turbine engine. In the example provided, vibration sensor 113 is an accelerometer and the vibration sensor output from vibration sensor 113 measures the broadband acceleration. In some embodiments, mathematical operations may be performed on the vibration sensor output to result in a velocity, a displacement, or a jerk of the turbine engine.

Task 214 extracts a vibration amplitude at the at least one harmonic frequency. For example, monitor system 110 may extract the vibration amplitude from the vibration sensor signal using any suitable techniques for extracting frequency information from a broadband signal. The vibration amplitude is illustrated on the vertical axis of FIG. 3.

Task 216 determines whether the harmonic indicator or the broadband acceleration indicate vibrations are present. For example, monitor system 110 may determine that vibrations are present when the harmonic indicator and/or the broadband acceleration exceed a first threshold. Monitor system 110 may determine whether the vibration amplitude of any individual harmonic frequency or of the aggregate magnitude is above a predetermined threshold that is based on noise and environmental effects to determine that there are vibrations present.

When vibrations are present, method 200 proceeds to task 224. Task 224 indicates damage may have and/or has occurred. For example, monitor system 110 may indicate that turbine engine 108 may have taken damage in a Crew Alerting System (CAS) message presented to the flight crew of aircraft 100. In the example provided, monitor system 110 causes aircraft 100 to generate a caution CAS message.

When vibrations are not present, method 200 proceeds to task 217. Task 217 determines whether the harmonic indicator has reached a second threshold. For example, monitor system 110 may determine that the harmonic indicator exceeds a predetermined value that has been shown to correlate with damage to the specific turbine engine make and model or specific aircraft make and model.

When the harmonic indicator has not reached the second threshold, method 200 proceeds to task 218. When the harmonic indicator has reached the second threshold, method 200 proceeds to task 224.

Task 218 indicates that no damage has occurred. For example, monitor system 110 may continue operating without generating any CAS messages or other flight crew indications that damage has occurred. Method 200 ends after task 218, but may be repeated for the entire duration of a flight or only when icy conditions 102 are detected.

Task 224 indicates that damage has occurred and indicates that manual inspection of the engine should be performed. For example, monitor system 110 may generate a warning CAS message to indicate that manual inspection of the fan casing of the turbine engine 108 should be performed.

The various embodiments described herein provide a solution to a technical problem. Specifically, the harmonics-based evaluation is more accurate than conventional methods and systems to detect damage to a fan case liner due to unbalanced rotation of a fan within a turbine engine. Additionally, the broadband acceleration-based evaluation is more accurate than conventional methods and systems to detect damage due to ice shedding from fan rotor blades in aircraft. The increased accuracy results in fewer manual inspections when no damage has occurred, resulting in fewer delays and reduced costs for aircraft operators.

Figure 4:
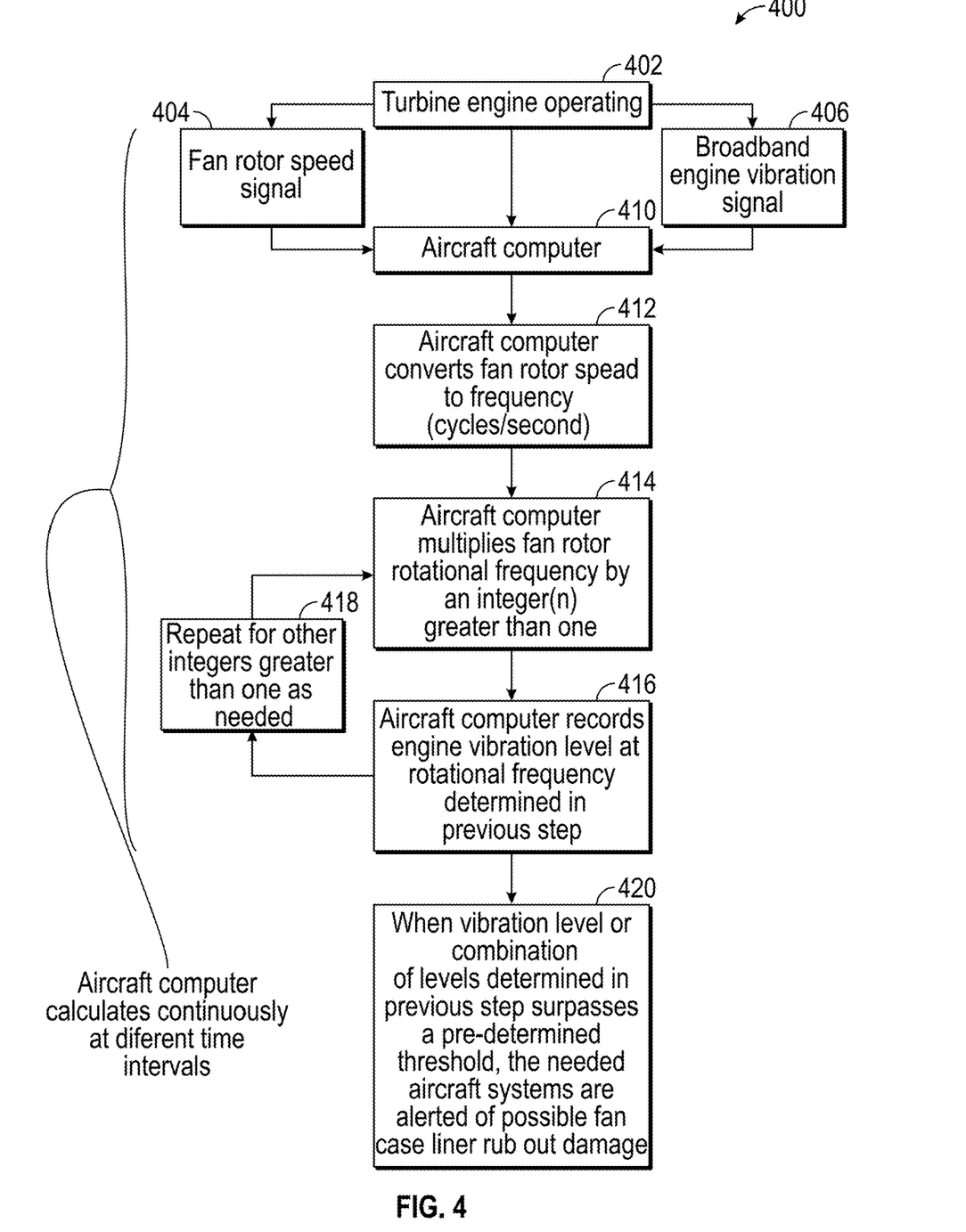
FIG. 4. is a flow diagram illustrating a data flow for detecting damage to a turbine engine of the aircraft of FIG. 1 in accordance with the teachings of the present disclosure.

Referring now to FIG. 4, and with continued reference to FIGS. 1-3, a data flow 400 for a flow of data related to the method of FIG. 2 is illustrated in accordance with some embodiments. Task 402 represents a turbine engine operating in an aircraft. For example, turbine engine 108 may be operating in aircraft 100 during a flight that may encounter icing conditions 102.

Turbine engine 108 generates a fan rotor speed signal 404, a broadband engine vibration signal 406, and various other data to be processed by aircraft computer 410. It should be appreciated that aircraft computer 410 may be an engine controller on aircraft 100 or may be an external device that is connected to a data bus or other communication port for receiving vibration sensor data from vibration sensor 113.

The aircraft computer converts 412 the fan rotor speed into a fan rotor frequency. For example, the fan rotor frequency may be expressed in cycles per second. The aircraft computer multiplies the fan rotor rotation frequency by an integer greater than one at 414. In some embodiments, a non-integer value is used to calculate a non-integer harmonic at 414. Tasks 414 and 416 are repeated for other integers greater than one for integer harmonics and/or for other non-integer numbers greater than one at 418.

When vibration levels or a combination of levels determined at 414 surpass a pre-determined threshold, the appropriate aircraft systems are alerted to the possibility of fan case liner rub out damage at 420. For example, aircraft 100 may generate a CAS message indicating that the fan case liner should be examined for potential damage.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those of ordinary skill in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An aircraft, comprising:
a turbine engine having a fan case with a fan case liner;
a vibration sensor attached to the turbine engine and configured to output a vibration sensor signal that indicates broadband acceleration of the turbine engine; and
a processor programmed to:
determine whether the broadband acceleration of the turbine engine indicates that damage to the fan case liner has occurred due to icing conditions; and
indicate that inspection of the fan case should be conducted in response to the broadband acceleration of the turbine engine indicating that damage to the fan case liner has occurred.

2. The aircraft of claim 1, wherein the processor is further programmed to:
extract a broadband vibration value from the vibration sensor signal; and
determine that the vibration sensor signal indicates that damage to the fan case liner has occurred in response to the broadband vibration value exceeding a broadband vibration threshold that indicates damage to the fan case liner due to ice shedding in the turbine engine may have occurred.

3. The aircraft of claim 1, wherein the processor is further programmed to:
retrieve a rotor rotation frequency of the turbine engine;
form a harmonic indicator based on at least one harmonic frequency of the rotor rotation frequency; and
determine that the vibration sensor signal indicates that damage to the fan case liner has occurred in response to the harmonic indicator exceeding a harmonic threshold that indicates damage to the fan case liner may have occurred due to an unbalanced rotor in the turbine engine.

4. The aircraft of claim 3, wherein the processor is further programmed to form the harmonic indicator using at least two higher order harmonic frequencies.

5. The aircraft of claim 4, wherein the processor is further programmed to form the harmonic indicator as an aggregate magnitude of the at least two higher order harmonic frequencies.

6. The aircraft of claim 1, wherein the processor is further configured to indicate that no damage has occurred to the turbine engine when the vibration sensor signal indicates that a broadband vibration value and harmonic frequencies of the turbine engine do not exceed damage indicator thresholds.

7. The aircraft of claim 1, wherein the processor is an engine controller on the aircraft.

8. The aircraft of claim 1, wherein the processor is a component of an external device that is configured to communicate with the vibration sensor to receive the vibration sensor signal during operation of the turbine engine.

9. The aircraft of claim 8, wherein the processor is further programmed to receive an input indicating a model of the aircraft and to determine whether the vibration sensor signal indicates that fan case liner damage has occurred based on the model of the aircraft.

10. A device for damage monitoring of a turbine engine having a fan case with a fan case liner, the device comprising:
an input port configured to receive a vibration sensor signal from a vibration sensor attached to the turbine engine, the vibration sensor signal indicating broadband acceleration of the turbine engine; and
a processor programmed to:
determine whether the broadband acceleration of the turbine engine indicates that damage to the fan case liner has occurred in the turbine engine due to icing conditions; and
indicate that inspection of the fan case should be conducted in response to the broadband acceleration of the turbine engine indicating that damage to the fan case liner has occurred.

11. The device of claim 10, wherein the processor is further programmed to:
extract a broadband vibration value from the vibration sensor signal; and
determine that the vibration sensor signal indicates that damage to the fan case liner has occurred in response to the broadband vibration value exceeding a broadband vibration threshold that indicates damage to the fan case liner due to ice shedding in the turbine engine may have occurred.

12. The device of claim 10, wherein the processor is further programmed to:
retrieve a rotor rotation frequency of the turbine engine;

form a harmonic indicator based on at least one harmonic frequency of the rotor rotation frequency; and determine that the vibration sensor signal indicates that damage to the fan case liner has occurred in response to the harmonic indicator exceeding a harmonic threshold that indicates damage to the fan case liner may have occurred due to an unbalanced rotor in the turbine engine.

13. The device of claim 12, wherein the processor is further programmed to form the harmonic indicator using at least two higher order harmonic frequencies.

14. The device of claim 13, wherein the processor is further programmed to form the harmonic indicator as an aggregate magnitude of the at least two higher order harmonic frequencies.

15. The device of claim 10, wherein the processor is further configured indicate that no damage has occurred to the turbine engine when the vibration sensor signal indicates that a broadband vibration value and harmonic frequencies of the turbine engine do not exceed damage indicator thresholds.

16. The device of claim 10, wherein the device is external to the turbine engine and an aircraft on which the turbine engine is installed and is configured to communicate with the vibration sensor to receive the vibration sensor signal during operation of the turbine engine.

17. The device of claim 16, wherein the processor is further programmed to receive an input indicating a model of the aircraft and to determine whether the vibration sensor signal indicates that fan case liner damage has occurred based on the model of the aircraft.

18. A device for damage monitoring of a turbine engine having a fan case with a fan case liner, the device comprising:

at least one non-transitory computer readable storage device having executable instructions stored thereon; and at least one processor associated with the at least one non-transitory computer readable storage device, wherein the executable instructions are configurable to cause the at least one processor to perform a method comprising the steps of:

receiving a vibration sensor signal provided by an accelerometer attached to the turbine engine, the vibration sensor signal indicating broadband acceleration of the turbine engine during operation;

retrieving a rotor rotation frequency of the turbine engine;

forming a harmonic indicator based on at least one harmonic frequency of the rotor rotation frequency;

extracting, from the vibration sensor signal, a vibration amplitude at the at least one harmonic frequency; and generating a potential engine damage alert based on characteristics of the harmonic indicator and the vibration amplitude.

* * * * *